Figure 1:
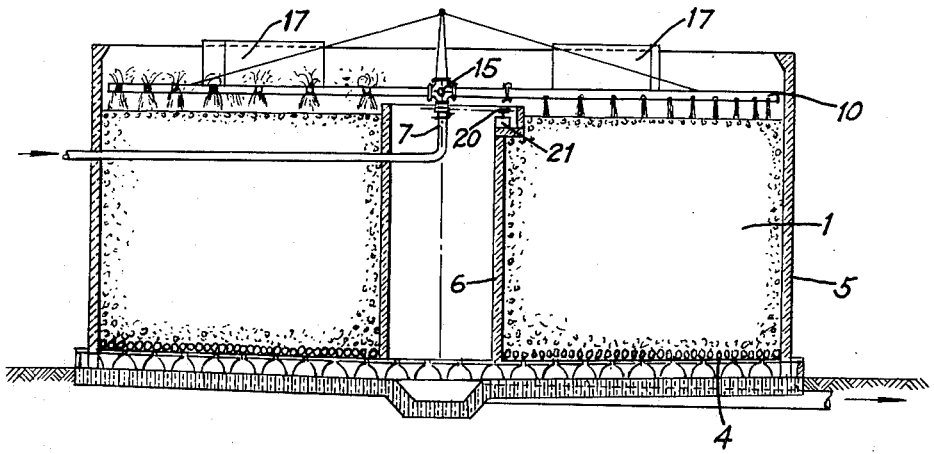

Nov. 2, 1965      A. SCHREIBER      3,215,274

DEVICE FOR THE BIOLOGICAL PURIFICATION OF SEWAGE

Filed Dec. 21, 1964

INVENTOR
AUGUST SCHREIBER
BY
Toulmin & Toulmin
ATTORNEYS

United States Patent Office 3,215,274
Patented Nov. 2, 1965

3,215,274
DEVICE FOR THE BIOLOGICAL PURIFICATION OF SEWAGE
August Schreiber, Bahnhofstrasse 45a, Hannover-Vinnhorst, Germany
Filed Dec. 21, 1964, Ser. No. 419,917
5 Claims. (Cl. 210—150)

This application is a continuation-in-part of application Serial Number 840,881, filed September 18, 1959, and now abandoned.

This invention relates to an apparatus for improving the productivity of a biological trickling filter. In the mechanical biological method of sewage treatment it has been old to use a rotary distributor for uniformly distributing sewage that has been mechanically clarified in a settling tank and to which foam from a trickling filter may have been added. The sewage is then sprayed upon the trickling filter, from which it is delivered to a secondary settling tank, and after being thus purified, can be pumped elsewhere.

In biological trickling filters the dissolved and colloidal materials in the sewage are consumed by the microorganisms and together with dead microorganisms are washed out from the trickling filter as water-insoluble slime. In such procedure the capacities of trickling filters have been increased and the amount of foam diminished, but with easily decomposable types of sewage such as those from dairies or from starch or sugar production it has not been possible to completely prevent foaming. In such cases the contents of the biological trickling filters had to be first removed, then freed from foam, and again returned to the filter before the latter can be used again. Efforts have also been made to wash out the foam from the filter by extra water from the spigots or from the fire extinguishing equipment.

Among the biological trickling filters that have been constructed in England have been those in which the rotating distributor is driven very slowly, whereby less foaming was produced and the filter capacity thereby increased. Many other efforts were made to prevent foaming. However, none of such efforts have achieved the desired results. There usually occurred too much foaming in the trickling filter on which not only the biological condition of the foam and the distribution of the sewage over the filter, but also the purification thereof is very dependent.

The present invention relates to a rotary distributor for use over a trickling filter whose capacity depends largely on how the sewage is distributed. In this invention the sewage which has been mechanically clarified in the settling tanks is delivered either alone or with the biologically active foam from the trickling filter to the rotary distributor for distribution over the trickling filter.

In order to avoid detrimental subsequent foaming in the trickling filter so as to permit greater loading thereof, it is suggested by this invention to provide a rotary distributor with one of its radial arms provided with outlet openings of larger diameter than those of the other arms, the latter arm having, if necessary, also a larger pipe diameter and/or durinng its face free or retarded rotation having also greater agitating ability. The remaining distributing arms of the rotary distributor deliver to the filter a smaller amount of sewage. The rotary distributor can be permitted to rotate freely of its own accord, or can be retarded in its rotation.

Rotary distributors usually effect a uniform distribution over the surface of the filter of the purified sewage which may have been mixed with small amounts of foam. Rotation of the filter is effected by reaction from the jets. The known rotary distributors then rotate so fast and distribute the mixture of sewage and foam so widely that much foam will be introduced into the filter to diminish its output or render it entirely inoperative because insufficient air can then pass through the contents of the filter to supply the necessary oxygen to the bacteria for maintaining aerobic digestion. There will then be a conversion from aerobic to anaerobic bacteria and the purification process then comes almost completely to an end. Puddles will then form on and in the filter, or the sewage will accumulate over the entire surface. If the distributor rotates too slowly, it will come to a complete stop and the sewage will pass through at only certain places, and without purification.

In order to avoid this, sufficient mechanically purified sewage and sewage foam mixture is deposited over a limited circular segment of the filter by means of a rotary distributor to produce sufficient agitation to wash into a secondary settling tank the foam that has been introduced into or has been formed in the filter. In order that the increased agitation which is effected by an increased amount of water added per m.² per unit of time with its proportionately lesser cleaning action may not be extended over the entire surface of the filter, only one of the radial arms has such larger outlet openings for washing out the foam from the filter. The remaininng radial arms spray only smaller amounts of sewage over the filter so as to ensure effective cleaning.

This is accomplished by imparting to the rotary distributor only a very slow rotation. Since the agiating arm of the distributor is mounted on the distributor head for rotary adjustment about its radial axis, it should for this purpose be positioned in such a manner that its outlet openings will be directed mainly in horizontal or vertical directions. By such adjustment the speed of rotation of the distributor can be adjusted. The head of the rotary distributor can also be provided with a belt or chain drive connected to a brake for retarding the rotation of the distributor. Another possibility is to provide one or more of the radial arms with vertical fins to make use of air resistance for slowing down the distributor.

Figure 2:
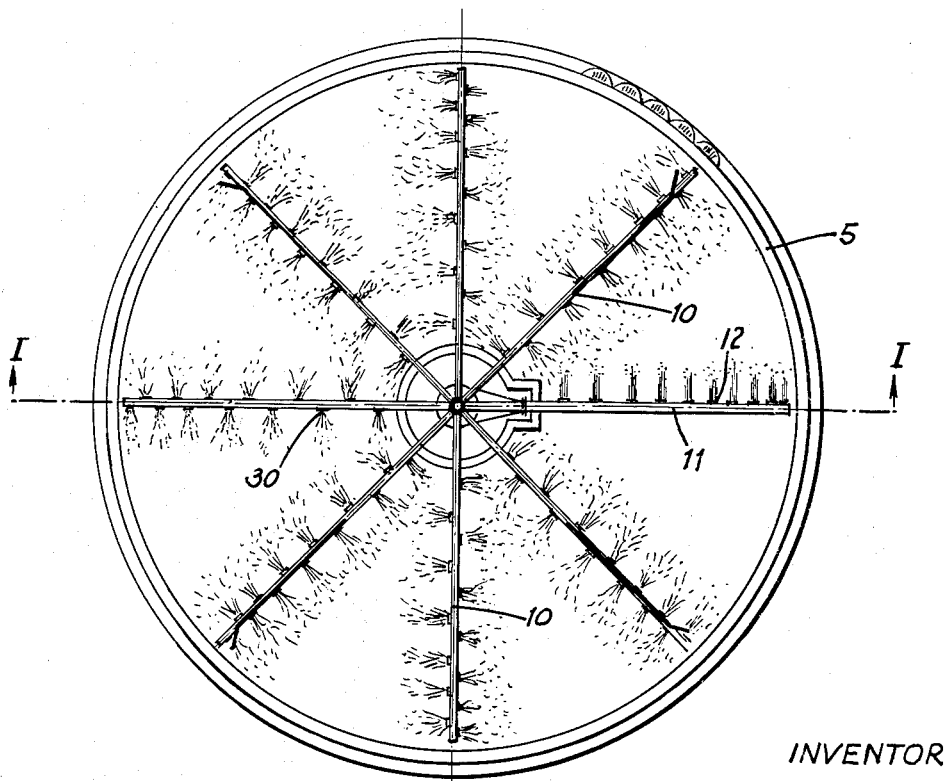

A suitable kind of apparatus for the practice of this invention is shown in the drawings wherein:

FIGURE 1 shows a vertical section of a trickling filter with its rotary distributor, taken on the line I—I of FIGURE 2; and FIGURE 2 shows a plan view of the same filter and distributor.

The biological trickling filter 1 of FIGURE 1 consists of a floor with a grating 4 thereon, a surrounding outer wall 5 and a hollow central shaft 6, the sewage as it enters and leaves the filter, and also the rotary distributor of this invention.

The distributor consists of a distributor head on a standpipe 7 to which the sewage is conducted and in the construction here illustrated it has eight distributing arms 10, one of which is an agitating arm 11 while the remaining seven are spraying arms.

The agitator arm is provided with numerous outlet openings 12, from which the sewage is discharged in concentrated jets upon the material in the filter. Near the head of the distributor the agitator arm has a rotatable coupling 15 by means of which it is possible to rotate the arm to bring its discharge openings into the desired angular positions so as to adjust the rotary reaction on the distributor. The arm is preferably adjusted to such a position that the distributor will rotate as slowly as possible. If the velocity of the distributor is still too great, then the distributor arms can have vertical fins 17 mounted on them for slowing rotation still more by air resistance resulting from centrifugal movement imparted thereby to the air. If, however, the velocity of rotation is still too great, then the distributor head can be provided with a pulley 20 for a V-belt or a chain sprocket for driving a rotary brake or a small electric dynamo 21.

The remaining radial arms are provided with outlet openings 30 which direct the sewage to both sides, both in the direction of rotation and in the opposite direction.

In the illustrated example ⅛ of the filter surface is sprayed with a relatively large amount of sewage with as little atomization as possible while the remaining ⅞ of the surface is sprayed by the seven remaining arms with atomized jets distributed as uniformly as possible. If the distributor rotates only slowly, then the foam will be washed out from under the agitating arm in about the same manner as in a heavily loaded filter, while the remainder of the surface will be sprayed by the atomizing jets as in a filter that is only slightly loaded. In this manner the advantages of both methods of operation will be retained.

At the same time the continually travelling jets of water-containing sewage over a limited portion of the filter will have the effect of filling with water any hollow air pockets that these jets may enter and at the same time effect more thorough aeration of the material in the filter.

The invention therefore makes it possible to regulate and improve biological activity and thereby also the purifying action of trickling filters satisfactorily in a prescribed manner. The invention is not only applicable to new installations, but can also be used for remodeling existing installations. The invention is also applicable to sewage which is difficult to purify by present methods such as the waste material from dairies or sugar or starch factories.

The invention is not limited to the embodiments described above, but all changes and modifications thereof not constituting departures from the spirit and scope of the invention are intended to be covered by the following claims.

What is claimed is:

1. In a sewage filtering device, a chamber containing biological trickling filter media, a rotating distributor centrally mounted to rotate over said media, said distributor comprising a central rotatable distributor head rigidly carrying a plurality of distributor arms radially extending therefrom, said distributor arms comprising a plurality of spraying arms having a plurality of longitudinally spaced discharge openings of a given cross section extending along each of said spraying arms and facing outwardly on opposite sides of said spraying arms for spreading sewage in finely divided condition over the widest possible surface of said filter media, and means for rotating said distributor head comprising one of said distributor arms comprising an agitator arm, said agitator arm having a plurality of longitudinally spaced jet openings of a larger cross section than said given cross section of said discharge openings distributed along said agitator arm for directing concentrated jets of sewage upon the surface of the filter media for agitating said surface, all of said jet openings in said agitator arm facing in one direction only.

2. The device as set forth in claim 1, wherein said rotating distributor is provided with means for retarding its speed of rotation.

3. The device as set forth in claim 1, including means mounting said agitator arm for rotary adjustment about its longitudinal axis, whereby the angularity of said jet openings and hence the speed of rotation of said distributor can be varied.

4. The device as set forth in claim 1, wherein at least two of said distributor arms are connected to upstanding fins above the surface of the sewage for encountering air to retard the speed of rotation of said distributor.

5. The device as set forth in claim 1, wherein the head of said rotating distributor is provided with a coaxial driving member connected by means of an endless driving member with a speed retarding device.

References Cited by the Examiner
UNITED STATES PATENTS

| | | | |
|---|---|---|---|
| 2,301,025 | 11/42 | Friend et al. | 210—150 X |
| 2,403,695 | 7/46 | Walker | 210—150 X |
| 2,767,020 | 10/56 | Knowles | 210—150 X |
| 2,769,547 | 11/56 | Hirsch | 239—254 X |
| 2,779,732 | 1/57 | Knowles | 210—150 |
| 3,113,100 | 12/63 | Moore | 210—520 X |

FOREIGN PATENTS 480,140  12/37  Great Britain.

REUBEN FRIEDMAN, *Primary Examiner.*